United States Patent
Choma et al.

(10) Patent No.: US 7,336,366 B2
(45) Date of Patent: Feb. 26, 2008

(54) METHODS AND SYSTEMS FOR REDUCING COMPLEX CONJUGATE AMBIGUITY IN INTERFEROMETRIC DATA

(75) Inventors: Michael Choma, Durham, NC (US); Joseph A. Izatt, Raleigh, NC (US); Anjul Davis, Durham, NC (US)

(73) Assignee: Duke University, Durham, NC (US)

( * ) Notice: Subject to any disclaimer, the term of this patent is extended or adjusted under 35 U.S.C. 154(b) by 209 days.

(21) Appl. No.: 11/336,652

(22) Filed: Jan. 20, 2006

(65) Prior Publication Data
US 2006/0232783 A1 Oct. 19, 2006

Related U.S. Application Data

(60) Provisional application No. 60/645,555, filed on Jan. 20, 2005.

(51) Int. Cl.
G01B 9/02 (2006.01)
G01B 11/02 (2006.01)

(52) U.S. Cl. .................. 356/479; 356/456; 356/497

(58) Field of Classification Search ............ 356/456, 356/479, 497
See application file for complete search history.

(56) References Cited

U.S. PATENT DOCUMENTS

| | | | |
|---|---|---|---|
| 5,994,690 A * | 11/1999 | Kulkarni et al. ............ 250/216 |
| 6,002,480 A * | 12/1999 | Izatt et al. .................. 356/479 |
| 6,239,878 B1 * | 5/2001 | Goldberg ..................... 356/520 |
| 7,019,838 B2 * | 3/2006 | Izatt et al. .................. 356/479 |
| 7,106,454 B2 * | 9/2006 | De Groot et al. ........... 356/511 |
| 7,148,970 B2 * | 12/2006 | de Boer ....................... 356/497 |
| 7,231,243 B2 * | 6/2007 | Tearney et al. .............. 600/407 |
| 7,239,398 B2 * | 7/2007 | De Groot et al. ........... 356/511 |
| 2006/0171503 A1 * | 8/2006 | O'Hara et al. ................ 378/21 |
| 2006/0256343 A1 * | 11/2006 | Choma et al. .............. 356/450 |
| 2007/0035743 A1 * | 2/2007 | Vakoc et al. ................ 356/511 |
| 2007/0091318 A1 * | 4/2007 | Freishlad et al. ........... 356/511 |
| 2007/0115476 A1 * | 5/2007 | Feldchtein et al. ......... 356/479 |
| 2007/0229801 A1 * | 10/2007 | Tearney et al. ............... 356/73 |

OTHER PUBLICATIONS

Yun, Tearney, de Boer and Boums; Removing the depth-degeneracy in optical frequency domain imaging with frequency shifting; Oct. 4, 2004, Optics Express, vol. 12, No. 20, pp. 4822-4828.*

* cited by examiner

Primary Examiner—Layla G. Lauchman
Assistant Examiner—Scott M Richey
(74) Attorney, Agent, or Firm—Myers Bigel Sibley & Sajovec

(57) ABSTRACT

A complex conjugate ambiguity can be resolved in an Optical Coherence Tomography (OCT) interferogram. A reference light signal is propagated along a reference path. A sample light signal is impinged on a sample reflector. The reference light signal is frequency shifted with respect to the sample light signal to thereby separate a positive and a negative displacement of a complex conjugate component of the OCT interferogram.

19 Claims, 5 Drawing Sheets

WAVENUMBER OFFSET (1/cm)

METHODS AND SYSTEMS FOR REDUCING COMPLEX CONJUGATE AMBIGUITY IN INTERFEROMETRIC DATA

RELATED APPLICATIONS

This application claims priority to U.S. Provisional Application Ser. No. 60/645,555 filed Jan. 20, 2005, the disclosure of which is hereby incorporated by reference in its entirety.

STATEMENT OF GOVERNMENT SUPPORT

This invention was made with Government support under grant number 5R24-EB00243 from the National Institutes of Health. The Government has certain rights to this invention.

BACKGROUND OF THE INVENTION

The present invention relates to methods and systems for imaging, and more particularly, to the reduction of image artifacts.

Since its introduction in the early 1990's, optical coherence tomography (OCT) has emerged as a promising imaging modality for micrometer-scale noninvasive imaging in biological and biomedical applications. Its relatively low cost and real-time, in vivo capabilities have fueled the investigation of this technique for applications in retinal and anterior segment imaging in ophthalmology (e.g., to detect retinal pathologies), early cancer detection and staging in the skin, gastrointestinal, and genitourinary tracts, as well as for ultra-high resolution imaging of entire animals in embryology and developmental biology. Conventional OCT systems are essentially range-gated low-coherence interferometers that have been configured for characterization of the scattering properties of biological and other samples. By measuring singly backscattered light as a function of depth, OCT fills a valuable niche in imaging of tissue ultrastructure, and provides subsurface imaging with high spatial resolution (~5-10 μm) in three dimensions and high sensitivity (>110 dB) in vivo with no contact needed between the probe and the tissue. OCT is based on the one-dimensional technique of optical coherence domain reflectometry (OCDR), also called optical low-coherence reflectometry (OLCR). See Youngquist, R. C., S. Carr, and D. E. N. Davies, *Optical Coherence Domain Reflectometry: A New Optical Evaluation Technique*. Opt. Lett., 1987. 12: p. 158; Takada, K., et al., *New measurement system for fault location in optical waveguide devices based on an interferometric technique*. Applied Optics, 1987. 26(9): p. 1603-1606; and Danielson, B. L. and C. D. Whittenberg, *Guided-wave Reflectometry with Micrometer Resolution*. Applied Optics, 1987. 26(14): p. 2836-2842. In some instances of time-domain OCT, depth in the sample is gated by low coherence interferometry. The sample is placed in the sample arm of a Michelson interferometer, and a scanning optical delay line is located in the reference arm.

The time-domain approach used in conventional OCT may be used in supporting biological and medical applications. An alternate approach involves acquiring the interferometric signal generated by mixing sample light with reference light at a fixed group delay as a function of optical wavenumber. Two methods have been developed which employ this Fourier domain (FD) approach. The first is generally referred to as Spectral-domain OCT (SDOCT). SDOCT uses a broadband light source and achieves spectral discrimination with a dispersive spectrometer in the detector arm. The second is generally referred to as swept-source OCT (SSOCT). SSOCT time-encodes wavenumber by rapidly tuning a narrowband source through a broad optical bandwidth. Both of these techniques can provide improvements in SNR of up to 15-20 dB when compared to time-domain OCT, because SDOCT and SSOCT capture the complex reflectivity profile (the magnitude of which is generally referred to as the "A-scan" data or depth-resolved sample reflectivity profile) in parallel. This is in contrast to time-domain OCT, where destructive interference is employed to isolate the interferometric signal from only one depth at a time as the reference delay is scanned.

However, SDOCT and SSOCT images generally contain sources of ambiguity and artifact. Because the Fourier transform of a real-valued spectral domain interferometric signal is Hermitian symmetric, sample reflectors at a positive displacement $+\Delta x$ with respect to the reference reflector are superimposed on those at a negative displacement $-\Delta x$. This is generally referred to as the complex conjugate ambiguity. In addition, different reflectors in a sample can generate an interference pattern with one another. This is generally referred to as an autocorrelation artifact. Moreover, the non-interferometric components of the detected spectral interferometric signal due to the source spectral shape transform to create artifactual signal at $\Delta x=0$ which can obscure reflectors positioned at zero pathlength difference. This is generally referred to as a "DC" or spectral artifact. There are generally accepted techniques for reducing the autocorrelation and spectral artifacts. Previous techniques for resolving the complex conjugate artifact have relied on collecting the in-phase and $\pi/2$-shifted (quadrature) components of a complex spectral interferometric signal generated by phase stepping interferometry or by 3×3 interferometry. These techniques may be cumbersome to implement.

SUMMARY OF EMBODIMENTS OF THE INVENTION

According to embodiments of the present invention, methods resolving a complex conjugate ambiguity in an Optical Coherence Tomography (OCT) interferogram are provided. A reference light signal is propagated along a reference path. A sample light signal is impinged on a sample reflector. The reference light signal is frequency shifted with respect to the sample light signal to thereby separate a positive and a negative displacement of a complex conjugate component of the OCT interferogram.

According to some embodiments of the invention, an interferometry system for resolving a complex conjugate ambiguity in an Optical Coherence Tomography (OCT) interferogram is provided. The system includes a reference light signal assembly configured to propagate a reference light signal via a reference path. A sample light signal assembly is configured to impinge a sample light signal on a sample reflector. The reference light signal assembly includes a modulator configured to frequency shift the reference light signal with respect to the sample light signal to thereby separate a positive and a negative displacement of a complex conjugate component of the OCT interferogram.

BRIEF DESCRIPTION OF THE DRAWINGS

FIGS. 4A-4B are graphs of the amplitude (au) as a function of wavenumber offset (1/cm) for a reflector at +100 µm and −100 µm pathlength difference, respectfully, with a 0 kHZ frequency shift. FIGS. 4C-4D are graphs of the amplitude (au) as a function of wavenumber offset (1/cm) for a reflector at +100 µm and −100 µm pathlength difference, respectfully, with a 20 kHZ frequency shift using heterodyne SSOCT.

FIG. 6A is an A-scan graph illustrating unresolved complex conjugate ambiguity and spectral and autocorrelation artifacts using homodyne SSOCT. FIG. 6B is an A-scan showing a reduction in complex conjugate ambiguity by using heterodyne SSOCT, thus resolving the complex conjugate ambiguity and filtering the spectral and autocorrelation artifacts.

DETAILED DESCRIPTION OF EMBODIMENTS OF THE INVENTION

Figure 1:
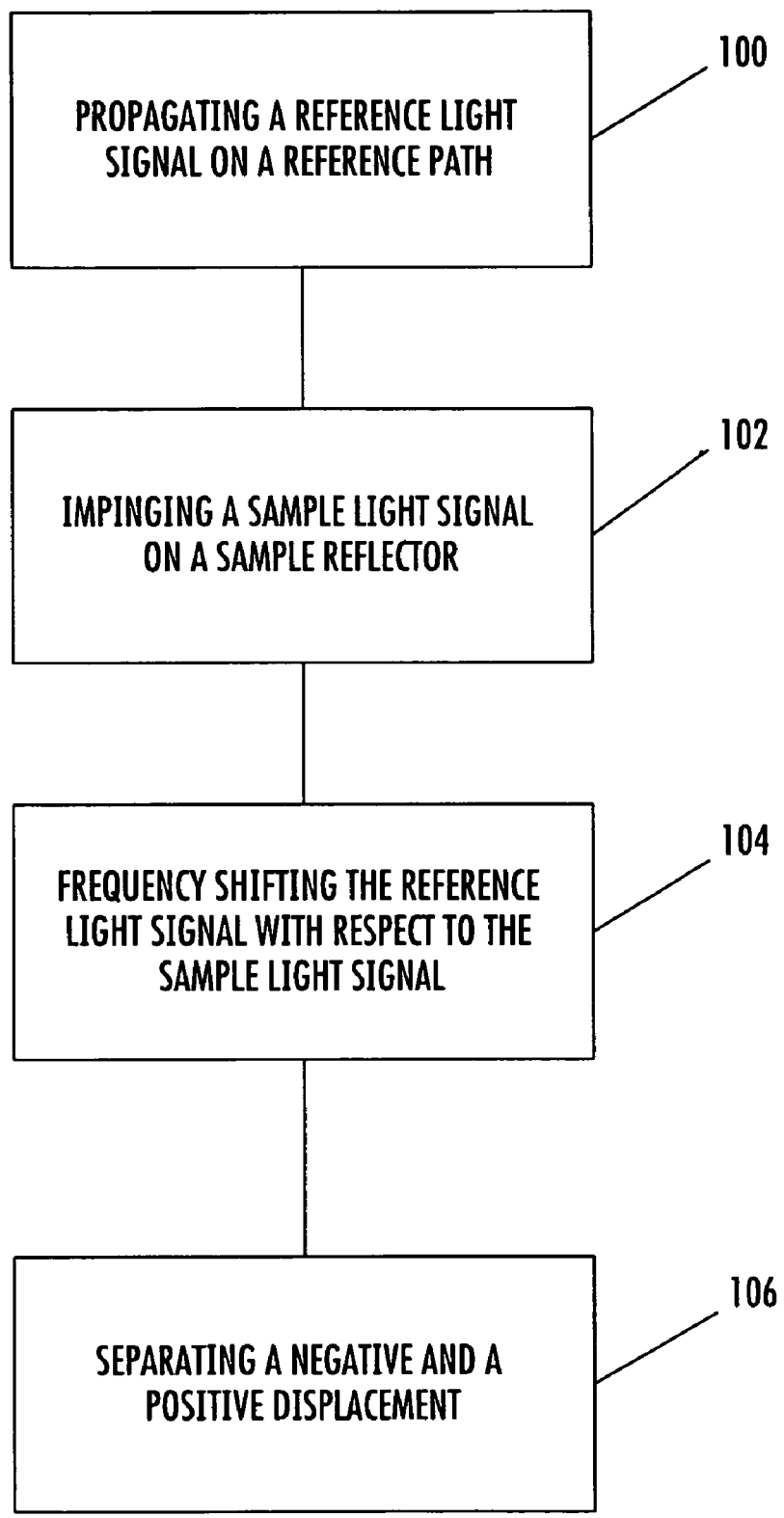
FIG. 1 is a flowchart illustrating operations according to embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer (such as an ultrasound device), and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

According to embodiments of the present invention, complex conjugate ambiguities can be resolved, and non-interferometric and autocorrelation artifact components can be reduced in an OCT interferogram. As shown in FIG. 1, a reference light signal is impinged on a reference reflector (Block 100). A sample light signal is impinged on a sample reflector (Block 102). The reference light signal is frequency shifted with respect to the sample light signal (Block 104). As a result of the frequency shift in the reference light signal, the positive and negative displacement components of the cross-interferometric component of the OCT interferogram are separated, and the cross-interferometric component is shifted with respect to the autocorrelation and spectral artifact components (Block 106). In some embodiments, the frequency shift is a Doppler shift.

The cross-interferometric component of the OCT interferogram corresponds generally to mixing of reflected light from the reference reflector and reflected light from the sample reflector. The cross-correlated component of the OCT interferogram may be obscured by various spectral artifacts, such as non-interferometric artifacts, complex conjugate artifacts and autocorrelation artifacts. The non-interferometric components refer to signal components that are not caused by interferences in pathlength differences between the reflected reference and sample signals. For example, the OCT interferogram can include DC components corresponding to non-interfering light returning from the sample and reference paths. The complex conjugate artifact refers to the superposition of sample reflectors at a positive displacement $+\Delta x$ with respect to the reference reflector on those at a negative displacement $-\Delta x$. The complex conjugate artifact is typically present in the Fourier transform of real-valued spectral domain interferometric signals. As discussed above, this complex conjugate of the cross-interferometric component is generally referred to as a complex conjugate ambiguity. In addition, an autocorrelation artifact, which is caused by interferences between at least two structures in the sample reflector, can be present. According to embodiments of the present invention, by frequency shifting the reference light signal, the positive displacement and negative displacement components of the cross-interferometric component are shifted by different amounts with respect to the spectral artifact components. The positive and negative displacement components may thus be distinguished from each other, and are also separated from the autocorrelation and spectral artifact components which may then be identified and reduced or removed from the interferogram.

Figure 2:
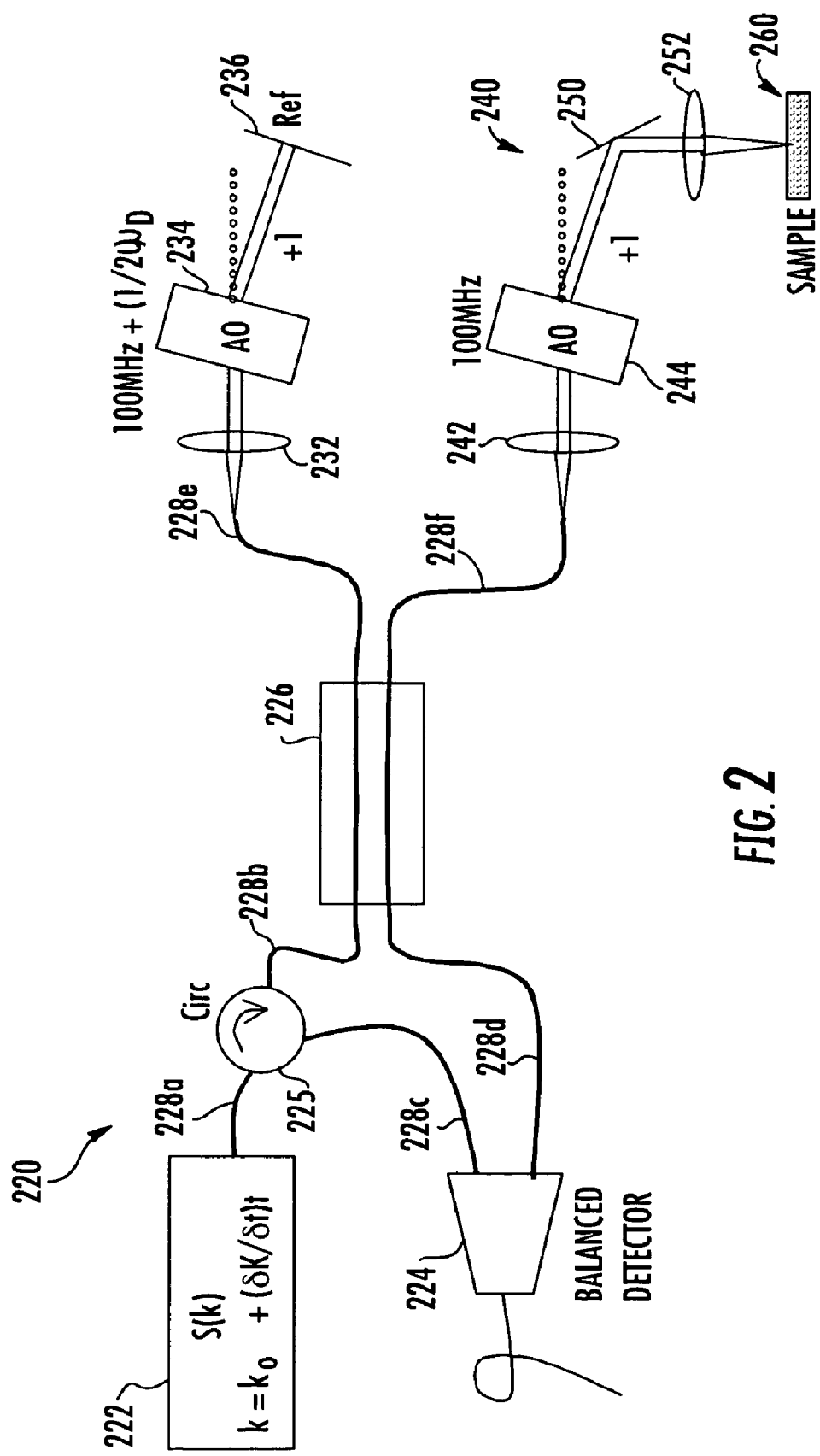
FIG. 2 is a schematic diagram of optical systems and methods according to embodiments of the present invention including a swept source interferometer and a Doppler shifted reference arm.

An exemplary optical system 210 according to embodiments of the present invention is illustrated in FIG. 2. The optical system 210 includes an interferometer assembly 220, a reference optical assembly 230 and a sample optical assembly 240. The interferometer assembly 220 includes a swept frequency light source 222 and a balanced detector 224 connected to a 2×2 fiber coupler 226 by an optical circulator 225 and optical fibers 228a-228d. The optical circulator 225 directs light from the swept source 222 to the fiber coupler 226, and light returning from the fiber coupler to an input optical fiber 228c of the balanced detector 224. The fiber coupler 226 has two output optical fibers 228e and 228f. The reference optical assembly 230 includes a collimating lens 232, a modulator 234 and a reference reflector 236. The sample optical assembly 240 includes a collimating lens 242, a modulator 244, an aiming mirror 250, a focusing lens 252, and a sample 260.

In this configuration, the modulators 234 and 244 can shift the reference optical field in optical fiber 228e by a carrier frequency in comparison to the sample optical field in optical fiber 228f. In some embodiments, the frequency shift can be a Doppler shift. Without wishing to be bound by theory, the resulting spectral interferometric signal can be encoded with a characteristic heterodyne beat frequency as a result of the frequency shift.

In particular, heterodyne detection in OCT using a modulated reference optical field can be used to reduce and/or remove ambiguity and artifacts, such as the complex conjugate ambiguity and the spectral and autocorrelation artifacts. By Doppler shifting the reference arm optical field in the optical fiber 228e, the cross-interferometric signal can be shifted up to a user-tunable frequency that corresponds to an electronic pathlength mismatch between the interferometer arms (i.e., the reflected light from optical fibers 228e and 228f). This electronic pathlength mismatching can recenter the magnitude of the complex reflectivity profile (which is generally referred to as the "A-scan" data) at an offset that can be far from DC, which may effectively resolve the complex conjugate ambiguity problem. Accordingly, spectral and autocorrelation artifact components can remain near DC in the resulting interferogram. The artifacts can then to be reduced or removed by high-pass filtering.

Although the optical system 210 of FIG. 2 is illustrated with respect to a swept source 222, an optical circular coupler 225, a detector 224, a reference optical assembly 230 and a sample optical assembly 240, it should be understood that other suitable configurations for OCT can be used. For example, as illustrated, the modulators 234 and 244 are acousto-optic (AO) modulators; however, other modulators or modulating configurations, including electro-optic modulators, or other techniques such as fiber stretching using piezo-electric actuators, can be used. As another example, the detector 224 is a balanced detector; however, other detectors and configurations suitable for SSOCT can be used, and/or the optical circulator 225 can be omitted. In particular, the optical circulator 225 sends light from the source 222 and optical fiber 228a to the fiber coupler 226 via optical fiber 228b. Light reflected from the sample 260 and the reference reflector 236 is received by the optical circulator 225 and sent to the balanced detector 224 via optical fiber 228c. Light reflected from the sample 260 and the reference reflector 236 is also received by the detector 224 via the optical fibers 228d, 228e and 228f. The reflected signal in the optical fiber 228c can be 180 degrees out-of-phase with the reflected signal in the optical fiber 228d. The balanced detector 224 can calculate the difference between the out-of-phase reflected signals in the optical fibers 228c, 228d. If the reflected signals in the optical fibers 228c, 228d are 180 degrees out-of-phase with one another, the interference components of the resulting signal will be twice that of the reflected signals in each of the optical fibers 228c, 228d. This can result in improved signal-to-noise ratios (SNR). In addition, the DC components of the signal can remain in phase with one another, and therefore, the DC components may be subtracted or reduced from the resulting signal.

It should be noted that frequency shifting of the reference arm light with respect to the sample arm light can be performed using various techniques. For example, a single frequency shifter can be provided in the reference arm or path, or a single frequency shifter can be provided in the sample arm or path. As illustrated in FIG. 2, a pair of frequency shifters, i.e., the modulators 234 and 244, are positioned in both the reference and the sample arms. The overall frequency shift caused by the modulators 234 and 244 is the difference between the individual shift frequencies of each of the modulator 234 and 244 of FIG. 2.

In some embodiments, a "k-trigger" sampling clock can provide sampling of the OCT signal at even intervals in wavenumber (k) to reduce the need for the computationally expensive step of spectral re-sampling. In order to be Fourier transformed into A-scan data using the Fast Fourier Transform (FFT) or similar techniques, interferometric spectra acquired using spectral domain OCT (SDOCT) techniques are generally evenly sampled in wavenumber (k). An alternative to the FFT, which does not necessarily require evenly spaced samples, is the Discrete Fourier Transform (DFT); however, current DFT techniques may not be computationally efficient. For grating spectrometer-based SDOCT implementations, spectral data (which is sampled evenly in wavelength in the spectrometer) is typically re-sampled into k before FFT transformation. Spectral interferometric data acquired from SSOCT systems (which sweep wavelength nonlinearly in time) are typically re-sampled prior to FFT. In order to re-sample the data in k, the nonlinearity itself may be characterized. Such re-sampling operations are typically computationally intensive, and reduce the speed of operation.

Figure 3:
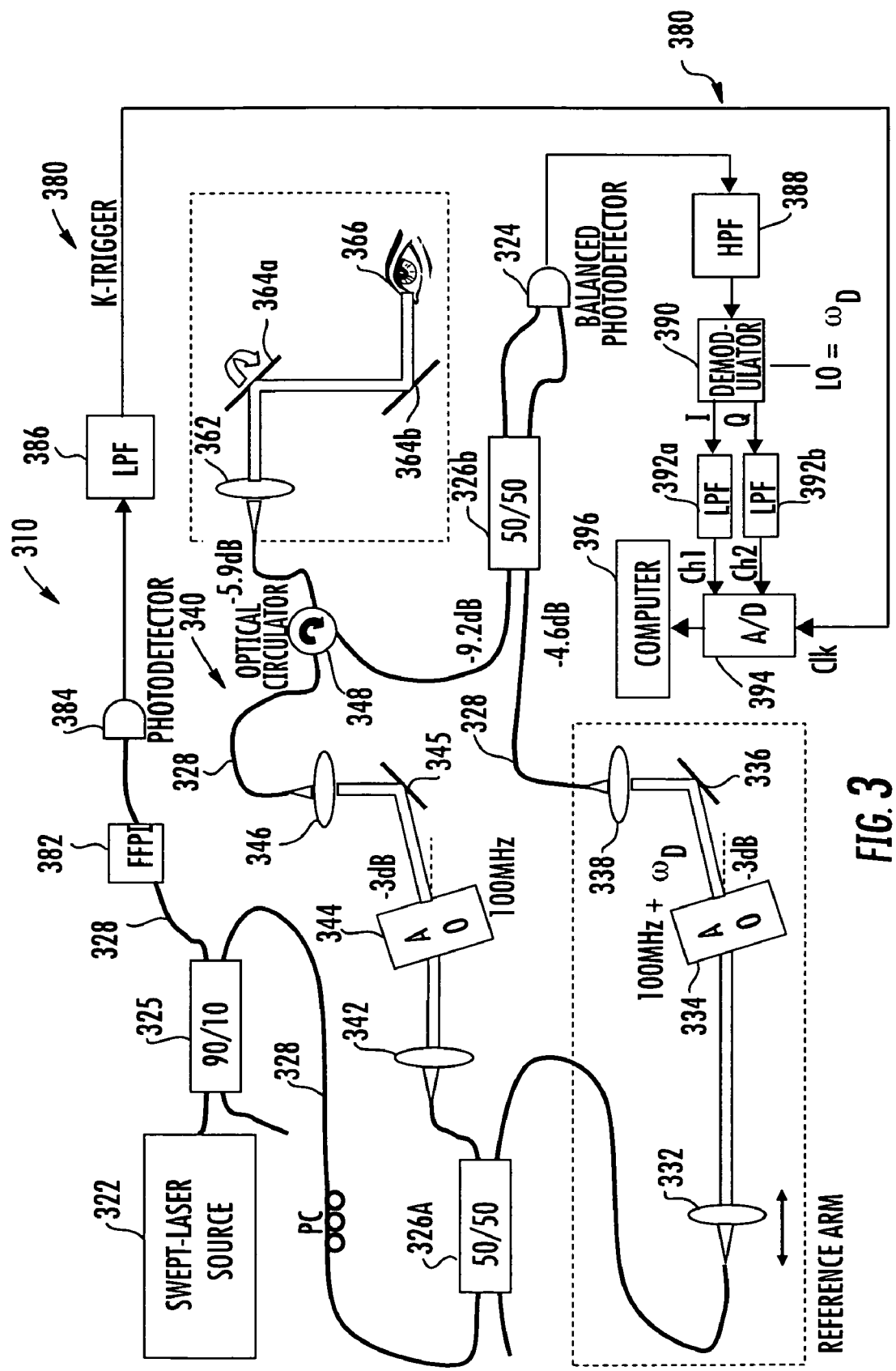
FIG. 3 is a schematic diagram of optical systems and methods according to embodiments of the present invention in which data is acquired evenly spaced in wavenumber (k).

FIG. 3 is a swept source OCT system 310 including a reference optical assembly 330, a sample optical assembly 340 and a k-trigger/signal processor assembly 380. The OCT system 310 also includes a swept-laser source 322 for sending light to the reference optical assembly 330 and the sample optical assembly 340 and a balanced photodetector 324 for detecting reflected light from the reference optical assembly 330 and the sample optical assembly 340.

In particular, the swept-laser source 322 is connected to a 90/10 fiber coupler 325a and a 50/50 fiber coupler 326a via optical fibers 328. The 90/10 fiber coupler 325 passes 10% of the light from the source 322 to the k-trigger assembly 380 and 90% of the light from the source 322 to the 50/50 fiber coupler 326a. The 50/50 fiber coupler 326a sends the light signal from the source 322 to the reference optical assembly 330 and the sample optical assembly 340.

The reference optical assembly 330 includes a collimating lens 332, a modulator 334, a mirror 336 and a focusing lens 338. Light transmitted through the reference assembly 330 is detected by the photodetector 324 via a 50/50 fiber coupler 326b. The sample optical assembly 340 includes a collimating lens 342, a modulator 344, a mirror 345, a lens 346, an optical circulator 348, a focusing lens 362, two sample aiming mirrors 364a, 364b and a sample 366. As illustrated, the sample 366 is a human eye; however, other samples can be used.

The k-trigger assembly 380 includes a Fiber Fabry-Perot interferometer (FFPI) 382, a photodetector 384, and an electronic low-pass filter 386. The k-trigger/signal processor assembly 380 also includes a high-pass filter 388, a in-phase/quadrature (I/Q) demodulator 390, two low pass filters 392a, 392b, an analog-to-digital converter 394 and a computer processor 396.

As illustrated in FIG. 3, a portion of the output of the swept source 322 is directed into a Fabry-Perot or other suitable interferometer (such as the FFPI 382), which is transmissive to peaks of incident light evenly spaced in k according to the free spectral range of a Fabry-Perot cavity of the FFPI 382 (which may be designed specifically to allow for sampling of the interferometric signal at any desired k interval). The light transmitted through the FFPI 382 is detected by a photodetector 384, the output of which may be converted by signal processing electronics (implemented using the low-pass filter 386 of FIG. 3) into a pulse train with pulse spacing proportional to the rate of change of wavenumber of the source 322. The pulse train may be referred to as a "k-trigger" and can be used to clock samples of the interferometric signal into an analog-to-digital converter, such as analog-to-digital converter 394, in preparation for Fast Fourier Transform (FFT) processing. The samples thus converted are acquired evenly spaced in wavenumber, k, and do not require numerical re-sampling prior to Fourier transformation. If the interferometric signal is frequency or Doppler shifted as described herein for complex conjugate ambiguity reduction, and subsequently coherently demodulated using the I/Q demodulator 390, then the demodulated I (in-phase) and Q (quadrature) components of the demodulated signal may also be sampled using the same k-trigger clock input from the low pass filter 386. Spectral re-sampling may not be needed.

As illustrated in FIG. 3, a detected interferometric signal from the photodetector 324 having cross-frequency components at frequencies of $\omega_n = (dk/dt)[x_R - x_n]$, and a Doppler shift at frequency $\omega_D$, is coherently demodulated by the demodulator 390 by mixing the signal with a cosine wave (producing the in-phase component, I) and with a sine wave (producing the quadrature component, Q) at the same frequency, $\omega_D$. The signal is further processed by low-pass filtering using low-pass filters 392a, 392b with a cutoff frequency between the maximum $\omega_n$ and $\omega_D$. Both I and Q components are then sampled using the k-trigger clock from the low pass filter 386, and may serve as real and imaginary components for Fourier transformation using FFT. A demodulation at the Doppler frequency $\omega_D$ mixes the interferometric signal down to baseband; in general, other demodulation frequencies $\omega$ may also be used if demodulation to an intermediate frequency (IF) is desired.

The system 310 of FIG. 3 may provide efficient detection of scattered light from the sample 366 because light from the sample 366 does not traverse any frequency-shifting elements (e.g., the modulator 334) prior to detection. Accordingly, improved SNR may be obtained even for light-sensitive samples by increasing the source light power level used.

Although embodiments according to the present invention are described herein with respect to Swept Source OCT, it should be understood that spatial heterodyning and demodulation techniques may be used for artifact reduction in spectral-domain (spectrometer-based) OCT. Optical systems using a k-trigger sampling clock can also be provided.

Embodiments according to the present invention will now be described with respect to the following non-limiting examples.

Exemplary Calculations

Without wishing to be bound by theory, in SSOCT, the photocurrent signal generated by n reflectors is related to $$i(k) \propto S(k) \left[ R_R + \sum_n R_n + 2\sqrt{R_R} \sum_n \sqrt{R_n} \cos(2k[x_R - x_n]) + 2 \sum_n \sum_{m \neq n} \sqrt{R_n R_m} \cos(2k[x_n - x_m]) \right] \quad (1)$$

Here, i(k) is the detector photocurrent as a function of optical wavenumber k; S(k) is the source power spectral density; $R_R$ and $R_n$ are the reflectivities of the reference and $n^{th}$ sample reflector, respectively; and $x_R$ and $x_n$ are the positions of the reference and $n^{th}$ sample reflector, respectively. The first two terms in the brackets on the right-hand side represents non-interferometric spectral artifact. The third term represents the cross-interferometric terms, and the fourth term represents the autocorrelation artifact.

Wavenumber is parameterized by time t by the relationship $k=k_o+t(dk/dt)$, where $k_o$ is the starting wavenumber and dk/dt is the light source wavenumber sweep velocity. This sweeping leads to the conversion of pathlength differences in the auto- and cross-terms to an electronic beat frequency in i(t), the time-varying photocurrent. The cross frequencies have instantaneous values of $\omega_n=(dk/dt)[x_R-x_n]$, and the auto frequencies have instantaneous values of $\omega_{nm}=(dk/dt)[x_n-x_m]$. If the reference arm optical field (i.e., of optical fiber 228e in FIG. 2) is Doppler shifted by some frequency $\omega_D$, then the time-varying photocurrent becomes:

$$i(t) \propto S(t) \left[ R_R + \sum_n R_n + 2\sqrt{R_R} \sum_n \sqrt{R_n} \cos([\omega_n - \omega_D]t + \phi_n) + 2\sum_n \sum_{m \neq n} \sqrt{R_n R_m} \cos(\omega_{nm}t + \phi_{nm}) \right] \quad (2)$$

where $\phi_n=k_o[x_n-x_m]$ and $\phi_{nm}=k_o[x_n-x_m]$. Doppler shifting acousto-optic or electro-optic modulators, such as acousto-optic modulators 234 and 244, or other standard techniques such as fiber stretching using piezo-electric actuators.

After Doppler shifting, the autocorrelation and source spectral terms remain centered at baseband, while the cross-interference terms are recentered around $\omega_D$. While the Fourier transform of i(t) remains Hermitian symmetric, the transform of fringes generated by pathlength differences of equal magnitude but opposite sign no longer overlap. Accordingly, the complex conjugate ambiguity can be identified and reduced or removed from the signal because positive displacements are above $\omega_D$, and negative displacements are below $\omega_D$ when $\omega_D$ is larger than the maximum $\omega_n$.

If the wavenumber sweep is linear over a bandwidth sweep ($\Delta k$) that takes $\Delta t$ seconds to complete, then $\omega_D$ corresponds to a pathlength shift of $x_D=\omega_D\Delta t/(2\Delta k)$. In some embodiments, the resulting shift reduces signal falloff. Falloff occurs in Fourier Domain OCT because the interferometric signal is integrated over the source linewidth at the photodiode. If the source linewidth is on the order of $2\pi/(x_R-x_n)$, then the linewidth spans an appreciable portion of the interferometric fringe. This decreases the fringe visibility, which decreases the peak height in the Fourier transform of i(t). Frequency shifting according to embodiments of the present invention creates a time-varying beat frequency that is independent of sweep speed or source linewidth and, as such, it may not be susceptible to falloff.

The cross-interferometric signal can be recovered by band pass filtering around $\omega_D$ with a noise equivalent bandwidth of $NEB=2x_{max}\Delta k/\Delta t$. If lock-in demodulation is performed on this band-passed signal around $\omega_D$, then the real and imaginary parts of the complex interferometric signal can be recovered:

$$i_{re}(t) = 2S(t)\sqrt{R_R} \sum \cos(\omega_n t + \phi_n) \quad (3)$$

$$i_{im}(t) = 2S(t)\sqrt{R_R} \sum \sin(\omega_n t + \phi_n)$$

Exemplary Experimental Setup

The heterodyne SSOCT optical system 210 shown in FIG. 2 can use a fiber-based swept laser source (Micron Optics, Inc. $\lambda_o$=1310 nm, $\Delta\lambda$=100 nm, 250 kHz sweep rate) as the source 222, acousto-optic modulators (Interaction, Corp.) as the modulators 234 and 244, and a balanced photodetector (New Focus, San Jose, Calif.) as the detector 224. The modulators 234 and 244 can have a common center frequency of 100 MHz, and the modulator 234 can have a user-adjustable offset from 100 MHz.

The diffraction efficiency of the modulators 234 and 244 was measured to be 60%, and the maximum diffracted optical bandwidth recoupled was 40 nm. It should be understood that the maximum diffracted optical bandwidth could readily be extended using additional optics. Spectral interferogram samples evenly spaced in wavenumber were clocked into the data acquisition system using a Fabry-Perot cavity pixel clock described in Choma, et. al., Opt. Exp. 11(18), 2183-2189 (2003). In this example, coherent demodulation as described in Eqs. 3 was not used; rather, the pixel clock spacing was set to satisfy the Nyquist criterion for the display range. The SNR of the system, near zero pathlength difference, with a −50 dB reflector, was measured to be 110 dB.

Results

Figure 4A:
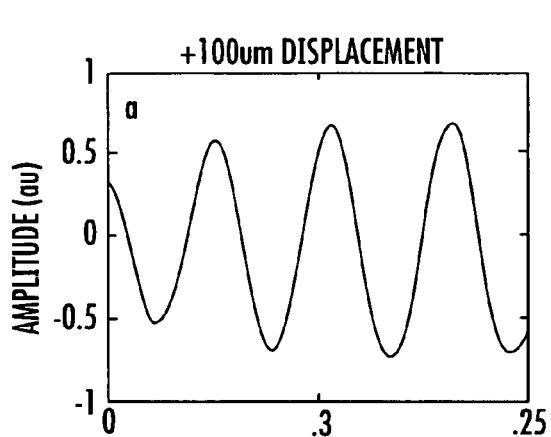
FIGS. 4A-4D are graphs of interferograms aquired using Swept-Source Optical Coherence Tomography (SSOCT) according to embodiments of the invention.
Figure 4B:
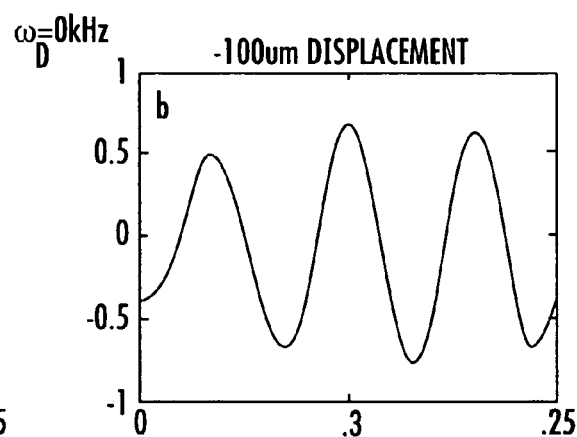
Figure 4C:
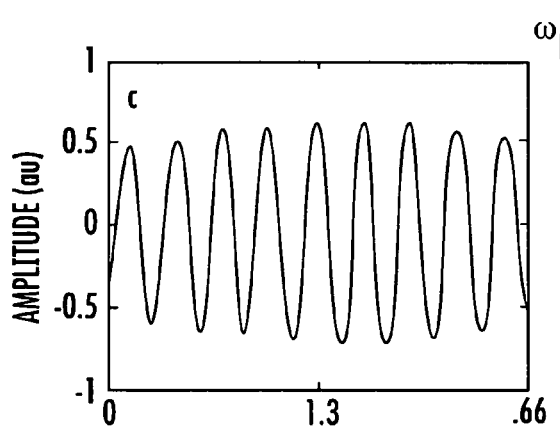
Figure 4D:
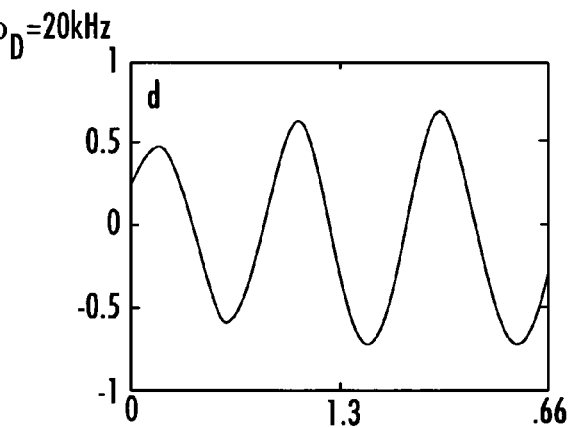

To illustrate the behavior of the cross-interferometric term in Eq. 2 with the reference arm frequency (e.g., as impinged on the reference reflector 236 in FIG. 2) shifted with respect to the sample arm (e.g., as impinged on the sample reflector 260 in FIG. 2), the fringe patterns of typical interferograms at two pathlength differences centered around zero with no frequency shift are shown in FIGS. 4A-4B, and with a 20 kHz frequency shift are shown in FIGS. 4C-4D. The fringe frequency for the cross-correlation term, when $\omega_D$=0, is generally identical for positive and negative equal displacements, and is thus ambiguous. However, when $\omega_D$=20 kHz, the fringe frequency for the positive displacement is higher than for a negative displacement, as expected from Eq. 2.

Figure 5A:
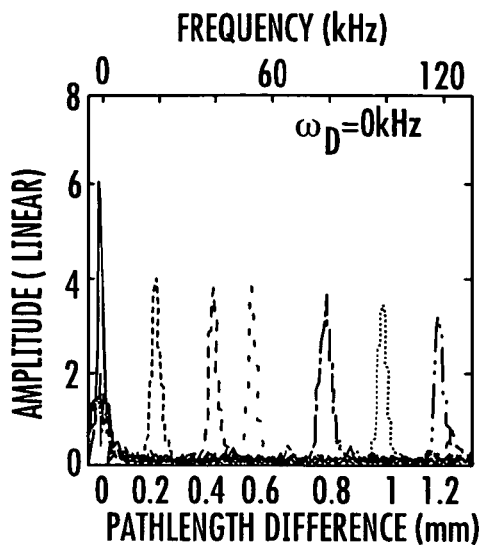
FIGS. 5A-5B are A-scan graphs of the falloff of the amplitude (on a linear scale) as a function of pathlength difference for homodyne SSOCT (FIG. 5A) and heterodyne SSOCT (FIG. 5B).
Figure 5B:
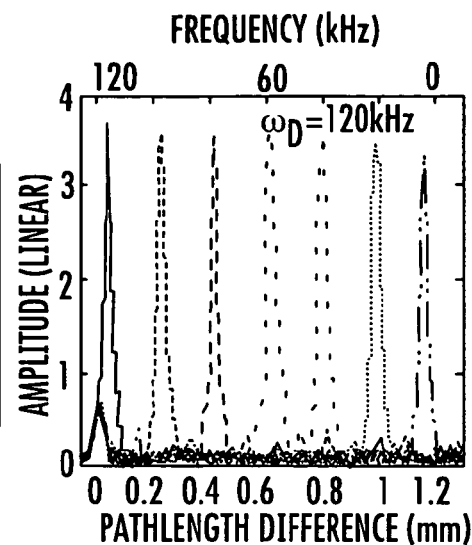
Figure 6A:
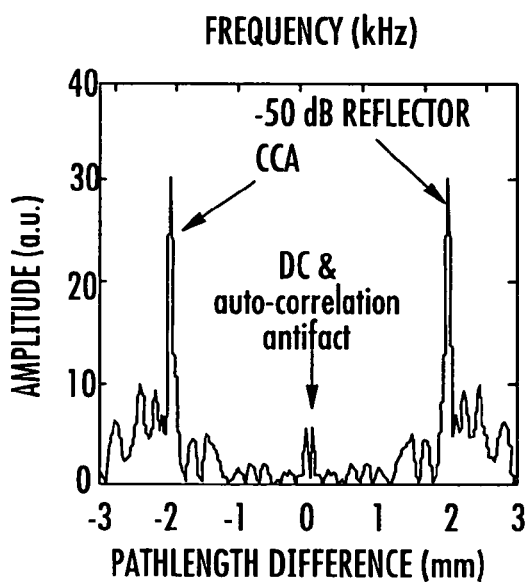
FIGS. 6A-6B are A-scan graphs of a −50 dB reflector at 2.0 mm pathlength difference (on a logarithmic scale).
Figure 6B:
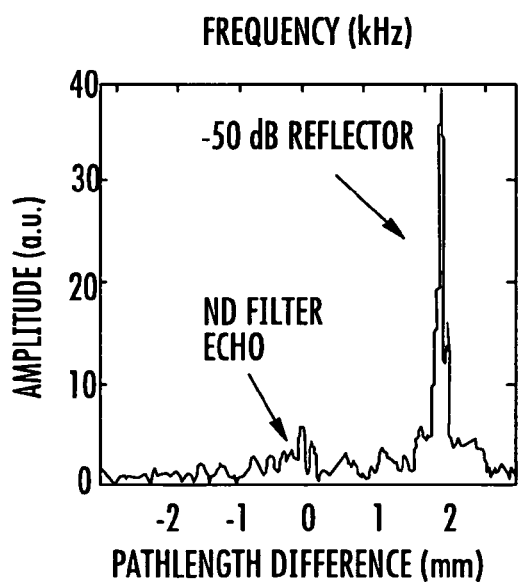

FIGS. 5A-5B illustrate that the signal falloff remains centered at zero pathlength difference, even as the electronic frequency is shifted. FIG. 5A illustrates the falloff centered at zero pathlength and zero frequency for homodyne SSOCT data. By shifting the zero pathlength difference frequency to 120 kHz, the image contents are moved away from DC and therefore removal of spectral and auto-correlation artifacts is achieved as shown in FIG. 5B. In FIGS. 6A-6B, a complete complex conjugate ambiguity resolution is demonstrated using heterodyne SSOCT. Using a −50 dB sample reflector placed at 2.0 mm pathlength difference, the complex conjugate ambiguity is shown in the A-scan acquired using homodyne SSOCT (FIG. 5A). Residual DC artifact is also present in the A-scan of FIG. 5A. By frequency upshifting the reference arm by 140 kHz, the complex conjugate ambiguity is resolved down to the noise floor of the system as shown in FIG. 5B.

Accordingly, heterodyne OCT using acousto-optic modulators can be used for artifact reduction, including complex conjugate ambiguity and DC artifact reduction or removal. This technique allows for a zero pathlength difference to be shifted away from electronic DC and reduces or eliminates falloff due to finite laser linewidth falloff in conventional OCT. Combined with coherent demodulation, this technique can provide access to the entire complex interferometric signal.

In addition, the demodulation of the shifted signal by mixing with a local oscillator at the Doppler shift frequency can provide efficient digitization of in-phase and quadrature components of the demodulated signal with reduced bandwidth requirements as compared to direct digitization of the shifted signal. The coherently demodulated signal may be digitized utilizing a k-trigger sampling clock, which allows for sampling of the SSOCT signal at even intervals in wavenumber and thus avoiding the computationally expensive step of spectral re-sampling which is otherwise required. While it is also possible, in principle, to upshift the cross-interferometric signal by placing the sample focus at a large pathlength mismatch, this physical pathlength mismatching can lead to significant signal attenuation due to amplitude falloff secondary to finite source linewidths. The frequency shifting techniques described herein may also reduce this falloff phenomenon.

In the drawings and specification, there have been disclosed typical preferred embodiments of the invention and, although specific terms are employed, they are used in a generic and descriptive sense only and not for purposes of limitation, the scope of the invention being set forth in the following claims. Moreover, various spectrometer and detector configurations and techniques known to those of skill in the art may be used to accomplish the functions and features of the embodiments described herein.

What is claimed is:

1. A method for resolving a complex conjugate ambiguity in an Optical Coherence Tomography (OCT) interferogram, the method comprising:
   propagating a reference light signal along a reference path;
   impinging a sample light signal on a sample reflector; and
   frequency shifting the reference light signal with respect to the sample light signal to thereby separate a positive and a negative displacement of a complex conjugate component of the OCT interferogram.

2. The method of claim 1, further comprising filtering the negative displacement component from the OCT interferogram.

3. The method of claim 1, wherein the OCT interferogram includes an autocorrelation artifact component and an spectral artifact component, wherein frequency shifting the reference light signal with respect to the sample light signal shifts the cross-interferometric component of the OCT interferogram with respect to the autocorrelation and spectral artifact components.

4. The method of claim 3, further comprising filtering the autocorrelation artifact component and the spectral artifact component from the OCT interferogram.

5. The method of claim 1, wherein frequency shifting the reference light signal with respect to the sample light signal includes Doppler shifting the reference light signal with respect to the sample light signal.

6. The method of claim 1, further comprising detecting a reflected reference light signal from the reference path and a reflected sample light signal from the sample reflector, wherein the OCT interferogram is an interference between the reflected reference light signal and the reflected sample light signal.

7. The method of claim 6, wherein the cross-interferometric component corresponds to a pathlength difference between the reflected reference light signal and the reflected sample light signal.

8. The method of claim 1, wherein the autocorrelation component includes an interference between at least two structures in the sample reflector.

9. The method of claim 1, further comprising sampling of the OCT interferogram at even intervals in wavenumber (k).

10. The method of claim 1, further comprising a detector configured to detect a reflected reference light signal from the reference path and a reflected sample light signal from the sample reflector, wherein the OCT interferogram is an interference between the reflected reference light signal and the reflected sample light signal.

11. The system of claim 10, wherein the cross-interferometric component corresponds to a pathlength difference between the reflected reference light signal and the reflected sample light signal.

12. The system of claim 10, further comprising a k-trigger assembly in communication with the detector and configured to sample the OCT interferogram at even intervals in wavenumber (k).

13. A interferometry system for resolving a complex conjugate ambiguity in an Optical Coherence Tomography (OCT) interferogram, the system comprising:
   a reference light signal assembly configured to propagate a reference light signal via a reference path;
   a sample light signal assembly configured to impinge a sample light signal on a sample reflector; and
   wherein the reference light signal assembly includes a modulator configured to frequency shift the reference light signal with respect to the sample light signal to thereby separate a positive and a negative displacement of a complex conjugate component of the OCT interferogram.

14. The system of claim 13, further comprising a filter configured to filter the negative displacement component from the OCT interferogram.

15. The system of claim 13, wherein the OCT interferogram includes an autocorrelation artifact component and an spectral artifact component, wherein frequency shifting the reference light signal with respect to the sample light signal shifts the cross-interferometric component of the OCT interferogram with respect to the autocorrelation and spectral artifact components.

16. The system of claim 15, further comprising a filter configured to filter the autocorrelation artifact component and the spectral artifact component from the OCT interferogram.

17. The system of claim 13, wherein the modulator is configured to Doppler shift the reference light signal with respect to the sample light signal.

18. The system of claim 15, wherein the autocorrelation component includes an interference between at least two structures in the sample reflector.

19. The system of claim 13, further comprising a coherent demodulator configured to demodulate an in-phase and a quadrature component of the interferogram signal to baseband.

* * * * *